United States Patent Office 3,753,963
Patented Aug. 21, 1973

3,753,963
PROCESS FOR PRODUCING HIGH SOFTENING POINT HYDROCARBON RESIN HAVING GOOD SOLUBILITY
Hideo Hayashi, Kawasaki, Hisatake Sato, Yokohoma, Japan, assignors to Nippon Petrochemical Co., Ltd., Tokyo, Japan
No Drawing. Filed Mar. 22, 1971, Ser. No. 126,898
Claims priority, application Japan, Mar. 23, 1970, 45/23,904
Int. Cl. C08f 15/01, 15/42
U.S. Cl. 260—82
6 Claims

ABSTRACT OF THE DISCLOSURE

A process for producing light colored aromatic hydrocarbon resins having high softening points of above 140° C., good solubility in hydrocarbon solvents and low bromine value, which comprises using a thermal cracked petroleum fraction having a boiling range of 140–220° C., below 7 wt. percent of styrene content, and above 5 wt. percent of total content of indene and its alkyl derivatives; polymerizing said fraction in the presence of a boron trifluoride type catalyst at a temperature between −30 to +40° C. within a period of 10 minutes to 15 hours under addition of phenol and/or alkylphenol; removing said catalyst after polymerization; and recovering said resin after separation of unpolymerized fraction and low molecular weight polymers from the resin-containing solution by evaporation or distillation.

---

This invention relates to a process for producing a high softening point aromatic hydrocarbon resins.

The hydrocarbon resin produced in accordance with the process of the present invention has a high softening point of above 140° C., a low bromine value of below 30 and good solubility against hydrocarbon solvents containing relatively small contents of aromatic hydrocarbons, and said resin can be used especially for paint and printing ink manufacture.

Petroleum hydrocarbon resins are generally produced by polymerizing a liquid fraction obtained by thermal cracking of petroleum fractions and resins with different characteristics can be obtained in accordance with the desired use.

The manufacture of hydrocarbon resins having a softening point of 140° C. or above is disclosed in U.S. Pat. No. 2,753,326 (Aug. 3, 1958). In the process, a thermal cracked petroleum fraction with boiling range of 80–280° F. is heat treated at 300° F. to dimerize into diolefin, and this dimerized fraction is treated at 400–700° F. to decompose cyclic diolefin dimer into monomer, while the aliphatic diolefin dimer fraction is not cracked and is caused to polymerize using a Friedel-Crafts catalyst. According to the examples of the reference, the resins obtained are such that the maximum softening point is 160° C. and the iodine value of the resins is very high such as 246 (156 as bromine value). Furthermore, the process of said reference is also different from that of the present invention from the viewpoint of raw materials. The resin of the aforementioned patent is very high in bromine value while the resin produced in accordance with the process of the present invention has low bromine value such as 30 or less. Therefore it will be understood that the structure of the resin of the present invention is utterly different from that of said patent. Further, if the resin of said patent is used for paint or printing ink as a raw material, the final products show inferior weatherproofing property, yellowing and poor chemical resistance.

Furthermore, the softening point of low bromine value petroleum hydrocarbon resins is low, such as 120° C., and the method of producing a resin having a softening point of 130° C. or above has not been known up to the present.

Further, paint and printing ink industries are looking for a petroleum hydrocarbon resin which has good solubility in hydrocarbon solvents containing a small amount of aromatics, a softening point of higher than 140° C. and a bromine value of lower than 30, however, a manufacturing process for such a resin has not yet been known.

The object of this invention is to provide a process for producing a light colored aromatic hydrocarbon resin which has high softening point of above 140° C. (ring and ball method), low bromine value of below 30 and good solubility against hydrocarbon solvents, the solvents of which have relatively low aromatic content and used for paint and printing ink.

The present inventors have, after intensive studies, found that the above-mentioned object can be attained by using specific raw materials and using a special catalyst system.

This invention relates to a process for producing aromatic hydrocarbon resin having a high softening point, a low bromine value, light color and good solubility by using a thermal cracked petroleum fraction boiling in the range of 140–220° C. as the raw material, wherein the unsaturated compounds contained are substantially styrene and its derivatives, and indene and its derivatives, and furthermore, the content of styrene has been adjusted below 7 wt. percent, the total content of indene and its alkyl derivatives is above 5 wt. percent, the rate of styrene content as defined in the following is below 15% and the rate of indene content above 11% as the raw material; by adding to the raw material one or a mixture of more than two kinds of phenol or alkylphenol in a range of 0.05–5 wt. percent on the basis of the raw material; by polymerizing with boron trifluoride type catalysts, by removing said catalyst after polymerization; and by recovering said resin after separation of the unpolymerized fraction and low molecular weight polymers from the resin-containing solution by evaporation or distillation.

The raw material used in this invention is thermal cracked petroleum fractions boiling from 140–220° C., of the by-products obtained in manufacturing of ethylene, propylene, butenes and butadienes by thermal cracking, such as steam cracking, of petroleum fractions such as naphtha, kerosene or light oil. The various components of the cracked fractions with such boiling range were analyzed by gas chromatography and the components having the following boiling points were detected as typical ones.

COMPONENTS OF THERMAL CRACKED PETROLEUM FRACTIONS BOILING FROM 140–220° C.

| | Boiling point (760 mm. Hg abs.) | Example of content (wt. percent) |
|---|---|---|
| Styrene | 145.8 | 13–20 |
| Allylbenzene | 156–157 | 0.1–1 |
| α-Methylstyrene | 165.4 | 0.5–6 |
| β-Methylstyrene | 175 | 0.5–6 |
| p-Vinyltoluene | 168 | |
| m-Vinyltoluene | 169 | 10–20 |
| o-Vinyltoluene | 171 | |
| Indene | 182.2 | 2–6 |
| Methylindene homologue | 184–206 | 0.1–2 |
| Dimethylindene and ethylindene homologue | >212 | |
| Xylene (o-, m- and p-isomers) | 138–142 | |
| Ethylbenzene | 136.2 | 17–10 |
| Isopropylbenzene | 152.5 | |
| Ethyltoluene (o-, m-, p-isomers) | 158–164.6 | 18–8 |
| n-Propylbenzene | 159.6 | 1–0.1 |
| Trimethylbenzene (1,3,5-; 1,2,4-; and 1,2,3-isomers) | 164.6–176.5 | 25–8 |
| Indane | 177 | 10–4 |
| Methylindane homologue | 182–203 | 2–0.5 |
| Dimethyl- or ethylindane homologue | >200 | |
| Naphthalene | 218 | |
| Others: | | |
| Dicyclopentadiene | 170 | 0.1–3 |
| Unidentified components | 140–220 | 0.7–5.4 |

Of the above components, styrene and its derivatives, indene and its derivatives and dicyclopentadiene are defined as polymerizable components.

That is, in order to obtain an aromatic hydrocarbon resin having softening point above 140° C. and which has good solubility in hydrocarbon solvents by the process of this invention, the requirements of the raw material oil are that the thermal cracked petroleum fraction obtained by thermal cracking of petroleum must have a boiling range of 140–220° C. and also meet with the following conditions.

(a) The total content of indene and its alkyl derivatives in the aforementioned raw material shall be above 5 wt. percent and furthermore, the rate of indene content as defined by Eq. 1 shall be above 11%.

Rate of indene content (percent)

$$= \frac{\text{Indene and its alkyl derivative in raw material (wt. percent)}}{\text{Polymerizable components in raw material (wt. percent)}} \times 100 \quad (1)$$

(b) The styrene content in the aforementioned raw material shall be below 7 wt. percent and furthermore, the rate of styrene content as defined by Eq. 2 shall be below 15%.

Rate of styrene content (percent)

$$= \frac{\text{Styrene content in raw material (wt. percent)}}{\text{Polymerizable components in raw material (wt. percent)}} \times 100 \quad (2)$$

The various components of the raw material are analyzed by gas chromatography under the following conditions.

(I) Styrene, allylbenzene, 1,3,5-trimethylbenzene and o-ethyltoluene are analyzed by packing Celite (product of Johns-Manville Corp.) containing 20 wt. percent of Apiezon L grease (product of Associated Electrical Industries Ltd.) in a column 3 meters in length and carrying with helium at a flow rate of 60 cc./min. at 100° C.

(II) Components other than those indicated in (I) are analyzed by packing Celite containing 20 wt. percent of ethylene glycol 4,000 in a column 3 meters in length and carrying with helium at a flow rate of 60 cc./min. at 125° C.

The softening point of the resin is measured in accordance with JIS K2531–1960 (ASTM E28–51T). Also, solvent solubility of the resin is determined by adding 2 parts by weight of the resin to 8 parts by weight of petroleum hydrocarbon solvent for printing ink use having the characteristics mentioned below, dissolving by heating to 100–150° C., cooling to 25±0.1° C. and observing the transparency of the resin solution with the naked eye at this temperature. When a uniformly transparent solution is obtained, it is deemed as "soluble" and when not transparent, it is "insoluble." The below petroleum hydrocarbon solvent is used as a solvent for paint and printing ink but the solubility of the aromatic hydrocarbon resin in such a solvent is not good because of its high boiling point and the low content of aromatic components. The solvent was selected for determining the solubility because it is considered that a resin which dissolves in this solvent also dissolves in other general hydrocarbon solvents for paint and printing ink uses.

CHARACTERISTICS OF PETROLEUM HYDROCARBON SOLVENT FOR SOLUBILITY TEST

| Test items | Measured values | Testing method |
|---|---|---|
| Specific gravity, 15/4° C. | 0.852 | JIS K2249–1961 |
| Aniline point (° C.) | 72.8 | JIS K2256–1962 |
| Distillation characteristics, initial boiling point (° C.) | 272 | JIS K2254–1965 |
| End point (° C.) | 308 | |
| Hydrocarbon component by FIA analysis, aromatic compounds (percent) | 23.2 | JIS K2536–1969 |
| Olefin compounds (percent) | 0.9 | |
| Saturated compounds (percent) | 75.9 | |

In this invention, the total content of indene and its alkyl derivatives can be adjusted to above 5 wt. percent, and also the rate of indene content to above 11% by adding indene or its alkyl derivatives, or a fraction which contains a large quantity, for example above 30 wt. percent, of these components, to the fraction having a boiling range of 140–220° C. in order to obtain the raw material which meet with the aforementioned conditions. As indicated in the aforementioned table, the boiling point of indene is high (182.2° C.) so that it is possible to use a fraction whose total content of indene and its alkyl derivative and the rate of indene content adjusted to the aforementioned limiting conditions by separating the light fraction from the cracked petroleum fraction boiling in the range of 140–220° C. as the raw material.

It is also possible to use a fraction containing a total content of indene and a rate of indene content which has been adjusted to the aforementioned limiting conditions by adding indene or its alkyl derivatives or a fraction containing a large quantity of these components to the fraction which has been separated by rectifying the light fraction from the cracked petroleum oil fraction having a boiling range of 140–220° C.

In order to adjust the styrene content and rate of styrene content to the aforementioned values, the method of removing by rectification the light fraction from the cracked petroleum fraction having a boiling range of 140–220° C. is effective as the boiling point of styrene is 145.8° C.

Aromatic hydrocarbon resins of light color having softening point above 140° C., bromine value below 30 and good solubility in the aforementioned solvents can be manufactured by adding one kind or a mixture of more than two kinds of phenol or alkylphenol in a range of 0.05–5 wt. percent based on the raw material, to the raw material which has been adjusted as above-mentioned; adding 0.01–5 wt. percent on the basis of the raw material of boron trifluoride type catalysts, for example gaseous boron trifluoride or boron trifluoride complex such as ether complex, phenol complex and alcohol complex of boron trifluoride, polymerizing from 10 min. to 15 hrs. in a temperature range of −30 to +40° C., removing the catalyst with an alkali such as sodium hydroxide or sodium carbonate and washing with water as required and then separating the unpolymerized raw material and low molecular weight polymer by evaporation or distillation.

The phenol or alkylphenol which is to be added when carrying out polymerization reaction may be added beforehand to the fraction prior to addition of the catalyst, or phenol or alkylphenol may be added to the raw material simultaneously with the catalyst, or a mixture of phenol or alkylphenol and the catalyst may be added to the fraction.

The polymerization reaction is carried out by adding phenol or alkylphenol by any of the aforementioned methods and when compared with the case these are not added, it is possible to obtain the desired petroleum resin without almost any lowering of resin yield.

One of the features of the process of this invention is one addition of 0.05–5 wt. percent on the basis of the fraction of phenol or alkyl phenol when polymerizing by adding one kind or a mixture of more than two kinds of phenol or alkylphenol and boron trifluoride type catalyst to the raw material which has been adjusted in such a manner that the boiling point of the thermal cracked petroleum fraction is in a range of 140–220° C. and which satisfies the aforementioned limiting condition of the raw material.

A petroleum resin which is the object of this invention, particularly a resin which satisfies the requirement of miscibility cannot be obtained if the added quantity is below 0.05 wt. percent. Also, the yield of resin will be poor and a satisfactory result cannot be obtained from the point of view of bromine value and softening point if the added quantity is above 5 wt. percent.

Another feature of this invention is that a thermal cracked petroleum fraction having a boiling range of 140–220° C., styrene content below 7 wt. percent, rate of styrene content below 15 wt. percent, total content of indene and its alkyl derivative above 5 wt. percent and rate of indene content above 11% is used as the raw material for polymerization.

The desired resin from the points of view of particularly bromine value, softening point and coloring of resin cannot be obtained if a fraction with boiling point below 140° C. is used. Also, not only will miscibility be unsatisfactory but also it will be disadvantageous industrially because the quantity of polymerizable components is generally smaller if a fraction with boiling point above 220° C. is used. Also, the styrene content and rate of styrene content are made below 7 wt. percent and 15%, respectively, and the desired resin cannot be obtained if even one of these conditions is not satisfied and a very unsatisfactory resin, particularly with respect to misciblity will be obtained.

Furthermore, raw material with the content of indene and its alkyl derivatives above 5% and the rate of content above 11% is to be used and the desired petroleum resin cannot similarly be obtained if even one of these conditions is not satisfied and it will be very unsatisfactory, particularly from the points of view of softening point, miscibility and coloring.

Further features of the process of this invention are as follows:

(1) It is possible to positively obtain light colored aromatic hydrocarbon resin which have softening point above 140° C., bromine value below 30 and which dissolves in hydrocarbon solvent having a relatively low content of aromatic components which could not be obtained previously as described in detail above by using a relatively simple apparatus and an easy method.

(2) A resin which has a high softening point and which dissolves very well in petroleum hydrocarbon solvents of the aforementioned characteristics used in the paint and printing ink industries can be obtained by using boron trifluoride type catalysts, controlling the total content of indene or its alkyl derivative and the rate of styrene content in the raw material and adding one kind or a mixture of more than two kinds of phenol or alkylphenol when carrying out polymerization and said resin can be used as the resin component of paint and printing ink.

(3) Also, the scope of its use is wide as not only its solubility in the aforementioned hydrocarbon solvents is good but also as it is possible to manufacture resin which is miscible with resins which are being widely used in the paint and printing ink industries such as medium oil length or long oil length oil-modified alkyd resin and epoxy ester resin which were entirely immiscible with this type of petroleum resin by changing the styrene content, rate of styrene content and the addition quantity of phenol or alkylphenol within the limiting ranges of this invention.

(4) The content of conjugated diolefin is very small as indicated in the aforementioned table as a thermal cracked petroleum fraction boiling in the range of 140–220° C. is used as the raw material oil in this invention and a thermal cracked petroleum fraction with boiling point in the range of 20–140° C. is not used. Consequently, the resin obtained is aromatic, its bromine value is low as this is below 30 and its color is light.

A comparison of the features of the aromatic hydrocarbon resin obtained by the process of this invention with previous petroleum resin when used for paint and printing ink is as follows.

(1) The softening point of the resin obtained by the process of this invention is high as it is above 140° C. and consequently, drying of the coating is fast, luster is good, there is no tackiness after drying and the coating has high hardness.

(2) As the bromine value is low, the resin of this invention has superior chemical resistance, water resistance and weatherability.

(3) As the bromine value is low and the color is light, it can be used for paint and printing ink using light-color pigments.

(4) As it can be dissolved completely in the aforementioned hydrocarbon solvents and also as it can improve the miscibility with resins for conventional paint and printing ink, it has a very wide range of utilization for uses taking the advantage of the features of the aforementioned (1)–(3).

Examples are given below but it is to be understood that these are only examples and this invention is not limited to these examples unless contrary to the aim of this invention.

EXAMPLE 1

A steam-cracked petroleum fraction (A) obtained as by-product of steam cracking of naphtha and having a boiling range of 140–220° C. was analyzed by gas chromatography and it was found that the polymerizable components were 48.5 wt. percent, styrene content 15.0 wt. percent and indene content 3.9 wt. percent. Consequently, the rates of styrene content and indene content were 30.9% and 8.0%, respectively.

The fraction (A) was rectified with a 30-tray rectifying column under a condition of charging temperature 150° C., temperature at top of column 145° C., temperature at bottom of column 175° C. and reflux ratio 2.0 and as a result, 87 wt. percent of the fraction (A) was recovered from the bottom of the column. The polymerizable components of said recovered fraction (B) was 49.3 wt. percent, styrene content 6.2 wt. percent, rate of styrene content 12.6%, indene content 4.5 wt. percent and rate of indene content 9.1%.

Also, the fraction (A) was rectified with the aforementioned rectifying column under a condition of charging temperature 160° C., temperature at top of column 153° C., temperature at bottom of column 190° C. and reflux ratio 3.5, 52 wt. percent of (A) was recovered from the bottom of the column. The polymerizable components of such recovered fraction (C) was 49.5 wt. percent, styrene content 0.1 wt. percent, rate of styrene content 0.2%, indene content 7.5 wt. percent and rate of indene content 15.2%.

These cracked fractions (A), (B), (C), and (B) having a concentrated indene fraction of 55 wt. percent content added, were used as the raw materials and polymerized under the conditions indicated in the table, the catalyst removed with aqueous sodium hydroxide solution, washed with water, the unpolymerized fraction and low molecular weight polymers were removed by distillation and as a result, aromatic hydrocarbon resins were obtained. The results are shown in Table 1, below.

TABLE 1 [1]

| | Raw material | | Composition of raw material oil | | | | | Characteristics of resin | | | |
|---|---|---|---|---|---|---|---|---|---|---|---|
| | Fractions | | | | | | | | | | |
| No. | Kind | Quantity used (parts by wt.) | Quantity of conc. indene used (parts by wt.) | Polymerizable components (wt. percent) | Styrene content (wt. percent) | Rate of styrene content (percent) | Indene content (wt. percent) | Rate of indene content (percent) | Yield of resin (wt. percent) | Softening point [2] (° C.) | Bromine value [3] (iodine value) | Solubility [4] |
| A-1 | A | 100 | 0 | 48.5 | 15.0 | 30.9 | 3.9 | 8.0 | 36.2 | 115 | 23 (36.5) | Insol. |
| B-1 | B | 100 | 0 | 49.3 | 6.2 | 12.6 | 4.5 | 9.1 | 36.4 | 123 | 20 (31.8) | Sol. |
| B-2 | B | 80 | 20 | 50.4 | 5.9 | 11.7 | 14.6 | 29.0 | 39.5 | 155 | 21 (33.3) | Sol. |
| C-1 | C | 100 | 0 | 49.5 | 0.1 | 0.2 | 7.5 | 15.2 | 37.0 | 142 | 18 (28.6) | Sol. |

[1] 0.15 wt. percent of phenol on the basis of raw material and 0.4 wt. percent of ethyl ether complex of boron trifluoride as catalyst were added and polymerized for 5 hrs. at 10° C.
[2] Ring and ball method (JIS K2531-1960). (ASTM E28-51T).
[3] By ASTM D-1158-57T.
[4] Solubility in aforementioned petroleum hydrocarbon solvent.

As is clear from the table, only resin with poor solubility can be obtained from the fraction (A) in which the styrene content is over 7 wt. percent and rate of styrene content is over 15%, such as No. A-1 in the table. Also, resin with high softening point of over 140° C. cannot be obtained from the fractions (A) and (B) in which the indene content is below 5 wt. percent and the rate of indene content is below 11%, such as Nos. A-1 and B-1 in the table.

However, it can be seen that Nos. B-2 and C-1 in which the styrene content, rate of styrene content, indene content, rate of indene content and the polymerization condition satisfy the limiting conditions of this invention produce resins having a softening point above 140° C. and have good solubility.

EXAMPLE 2

Polymerization was carried out under the conditions shown in Table 2 by using the raw material of No. B-2 of Table 1, that is, a mixture of 80 wt. percent of the fraction (B) and 20 wt. percent of concentrated indene fraction, the after treatment of polymerization reaction was carried out as explained in Example 1, but employing evaporation to remove the unpolymerized part of said fraction and low molecular weight polymers, and then the resin was obtained. The results are shown in Table 2 below, in order to show the effect of addition of phenol and/or alkylphenol.

TABLE 2 [1]

| | Phenol or Alkylphenol | | Catalyst | | | | Characteristics of resin | | | | |
|---|---|---|---|---|---|---|---|---|---|---|---|
| No. | Kind | Addition quantity (wt. percent) | Kind | Addition quantity (wt. percent) | Polymerization temp. (° C.) | Polymerization time (hr.) | Yield of resin (wt. percent) | Softening point (° C.) | Bromine value (iodine value) | Solubility | Color |
| B-3 | | 0 | BF₃ gas | 0.20 | 10 | 5 | 40.8 | 158 | 20 (31.8) | Insoluble | 2 |
| B-4 | Phenol [2] | 0.50 | BF₃ gas | 0.20 | 10 | 5 | 39.8 | 153 | 21 (33.3) | Soluble | 2 |
| B-5 | do. [2] | 0.50 | BF₃Et₂O | 0.40 | 10 | 5 | 39.5 | 152 | 22 (34.9) | do | 2 |
| B-6 | do. [3] | 0.80 | BF₃2C₆H₅OH | 0.50 | 10 | 5 | 39.2 | 149 | 21 (33.3) | do | 2 |
| B-7 | do. [2] | 0.80 | BF₃2C₆H₅OH | 0.50 | -10 | 7 | 39.0 | 151 | 21 (33.3) | do | 2 |
| B-8 | Mixed cresol [4] | 0.80 | BF₃2C₆H₅OH | 0.60 | 10 | 5 | 39.5 | 150 | 21 (33.3) | do | 2 |
| B-9 | Phenol [2] | 10.0 | BF₃2C₆H₅OH | 0.60 | 10 | 5 | 37.0 | 121 | 23 (36.5) | do | 8 |

[1] The same raw material as that in No. B-2 of Table 1 was used.
[2] Phenol was added beforehand to the raw material oil prior to containing of the catalyst with the raw material and then the catalyst was contacted thereafter.
[3] A mixture of phenol and catalyst was added to the raw material oil.
[4] Cresol and catalyst were added simultaneously to the raw material oil. Composition of mixed cresol: phenol 42.8 wt. percent, o-cresol 12.3 wt. percent, m- and p-cresol 36.9 wt. percent, xylenol 8.0 wt. percent.

The same raw material was used in Nos. B-3 to B-9 of Table 2. Although it met with the limiting conditions of the raw material of this invention, the solubility became poor under polymerization without adding phenol or alkylphenol, as shown in No. B-3. Also, when the phenol addition quantity was over 5 wt. percent, the softening point became less than 140° C., and the color became an unfavorable reddish brown, as shown in No. B-9.

Variations in the kind of BF₃ type catalysts, and kind, quantity and addition method of phenol within the limiting conditions of this invention, gave good results as shown in Nos. B-4 to B-8, and resins having softening points of not less than 140° C., good solubility, low bromine value and light color could be obtained. Also, the resin obtained in No. B-8 was miscible with alkyd resin modified with linseed oil of 55% oil length at any mixing ratios.

Comparative example

There were prepared steam-cracked naphtha fractions (D), (E) and (F) having a boiling range of 20–140° C., of 30–150° C., and of 35–170° C., respectively.

Polymerization reactions were carried out by using those fractions and such fractions with 10 wt. percent of indene added under the same conditions of Note 1 of Table 1. The results are shown in Table 3.

The polymerizable components indicated in Table 3, include diolefins, monoolefins and the polymerizable components defined in this invention.

TABLE 3

| | Steam-cracked naphtha fractions | | Raw material | | | | | Characteristics of resin | | | |
|---|---|---|---|---|---|---|---|---|---|---|---|
| No. | Kind | Boiling point range (° C.) | Steam-cracked naphtha fractions | Indene addition quantity (wt. percent) | Polymerizable components (wt. percent) | Rate of content of indene (percent) | Yield of resin (wt. percent) | Softening point (° C.) | Bromine value (iodine value) | Solubility | Color |
| D-1 | D | 20-140 | 100 | 0 | 32.0 | 0 | 20.5 | 62.0 | 92 (146) | Soluble | 3 |
| D-2 | D | 20-140 | 90 | 10 | 38.8 | 25.8 | 26.5 | 68.0 | 77 (122) | do | 3 |
| E-1 | E | 30-150 | 100 | 0 | 35.0 | 0 | 22.0 | 72.0 | 90 (142) | do | 3 |
| E-2 | E | 30-150 | 90 | 10 | 41.5 | 24.1 | 28.0 | 79.0 | 78 (123) | do | 3 |
| F-1 | F | 35-170 | 100 | 0 | 37.5 | 0 | 24.5 | 75.0 | 87 (138) | do | 2 |
| F-2 | F | 35-170 | 90 | 10 | 43.7 | 22.9 | 30.0 | 82.0 | 75 (119) | do | 2 |

It is apparent from Table 3 that the softening points of the resins obtained are very low and the bromine values are high over 30 when steam-cracked petroleum fractions having boiling point ranges shown in Table 3 are used even if the indene content is over 5 wt. percent and the rate of indene content is over 11%.

What is claimed is:

1. A process for producing light colored aromatic hydrocarbon resins having high softening points of above 140° C., solubility in hydrocarbon solvents and low bromine values of below 30, which comprises using a hydrocarbon fraction obtained by thermal cracking of petroleum which fraction has a boiling range of 140°–220° C., a styrene content below 7 weight percent, a rate of styrene content below 15%, a total content of indene and its alkyl derivatives above 5 weight percent, and a rate of indene content above 11%; polymerizing said fraction in the presence of a boron trifluoride type catalyst in the range of 0.01–5 weight percent based on said fraction at a temperature between −30 and +40° C. within a period of ten minutes to 15 hours under the addition of phenol, alkylphenol or mixtures thereof in the range of 0.05–5 weight percent based on said fraction; removing said catalyst after polymerization; and recovering said resin after separation of the unpolymerized part of said fraction and low molecular weight polymers from the resin-containing solution by evaporation or distillation; wherein the percentage rate of styrene content is equal to 100 times the weight percent styrene content in said fraction divided by the weight percent of the polymerizable components said fraction, and the percentage rate of indene content is equal to 100 times the weight percent of indene and its alkyl derivatives in said fraction divided by the weight percent of the polymerizable components in said fraction.

2. A process according to claim 1 wherein said boron trifluoride type catalyst is a member selected from the group consisting of gaseous boron trifluoride, ether complex of boron trifluoride, phenol complex of boron trifluoride, and alcohol complex of boron trifluoride.

3. A process according to claim 1 wherein said fraction is obtained by the steam cracking of naphtha, kerosene or light oil.

4. A process according to claim 1 wherein said fraction is obtained by the steam cracking of naphtha, and said fraction is polymerized under the addition of phenol.

5. A process according to claim 4 wherein the catalyst is selected from the group consisting of gaseous boron trifluoride, ethyl ether complex of boron trifluoride and the phenol complex of boron trifluoride.

6. A process according to claim 1, wherein said fraction is obtained by the steam cracking of naphtha, said fraction is polymerized under the addition of cresol, and the catalyst is the phenol complex of boron trifluoride.

References Cited
UNITED STATES PATENTS 2,965,612  12/1960  Holland _____ 260—82
3,083,174   3/1963  Fefer et al. _____ 260—82

HARRY WONG, Jr., Primary Examiner

U.S. Cl. X.R.

260—33.6 R, 836